(12) United States Patent
Shamis

(10) Patent No.: US 10,540,433 B1
(45) Date of Patent: Jan. 21, 2020

(54) SERVICE FOR IMPLEMENTING FORM FIELDS

(71) Applicant: Amazon Technologies, Inc., Reno, NV (US)

(72) Inventor: Mark Shamis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 561 days.

(21) Appl. No.: 13/692,813

(22) Filed: Dec. 3, 2012

(51) Int. Cl.
*G06F 17/24* (2006.01)

(52) U.S. Cl.
CPC ................... *G06F 17/243* (2013.01)

(58) Field of Classification Search
CPC ...................................... G06F 17/243
USPC ......................................... 715/224
See application file for complete search history.

(56) References Cited

U.S. PATENT DOCUMENTS

| | | | | |
|---|---|---|---|---|
| 9,639,853 B2 * | 5/2017 | Shiffert | ............... | G06Q 30/0239 |
| 2008/0256213 A1 * | 10/2008 | Carrier | ................... | G06Q 30/02 709/207 |
| 2010/0185546 A1 * | 7/2010 | Pollard | ............... | G06Q 10/0637 705/80 |
| 2011/0023017 A1 * | 1/2011 | Calvin | ...................... | G06F 8/24 717/120 |
| 2011/0314371 A1 * | 12/2011 | Peterson | ............... | G06F 21/645 715/234 |
| 2013/0205370 A1 * | 8/2013 | Kalgi et al. | ........................ | 726/3 |
| 2013/0246266 A1 * | 9/2013 | Coleman | ............ | G06Q 30/0641 705/44 |
| 2014/0075280 A1 * | 3/2014 | Laakmann | ............... | G06F 17/30 715/225 |
| 2014/0108043 A1 * | 4/2014 | Ach | ........................ | G06Q 10/10 705/3 |

OTHER PUBLICATIONS eBay, How to Pay using PayPal, Jun. 8, 2008, eBay Inc., http://pages.ebay.com.hk/eng/paypal/buyer.html, p. 2.*
Aron Hsiao, Join eBay in 10 Easy Steps, Nov. 18, 2012, about.com, http://ebay.about.com/library/bl_vis_register.htm, pp. 1-6.*
Anonymous, "How to Create Your First Web Form" captured at www.jotform.com/help/2-How-to-Create-Your-First-Web-Form by archive.org, Mar. 8, 2012, Interlogy, LLC, pp. 1-4 (Year: 2012).*
JotForm, How to Create Your First Web Form, User Guide, Mar. 8, 2012, JotForm, 4 pp. (Year: 2012).*
W3C, Anne van Kesteren, "Cross-Origin Resource Sharing," downloaded from http://www.w3.org/TR/cors/, Apr. 3 2012, pp. 1-24.

(Continued)

*Primary Examiner* — Scott T Baderman
*Assistant Examiner* — Seung Woon Jung
(74) *Attorney, Agent, or Firm* — Robert C. Kowert; Kowert, Hood, Munyon, Rankin & Goetzel, P.C.

(57) ABSTRACT

A service for implementing form fields is described. The service may include receiving (e.g., from a browser) information regarding input received to one or more fields rendered in a browser application. The service may also include forwarding the information to a subscriber of the service. An indication that the information was forwarded may be provided to the browser. In some instances, the service may be implemented without executing server-side code on a server of the entity that provided content that includes the form.

20 Claims, 7 Drawing Sheets

(56) References Cited

OTHER PUBLICATIONS

Veena Basavaraj. "Leaving JSPs in the dust: moving LinkedIn to dust.js client-side templates" downloaded from http://engineering.linkedin.com/frontend/leaving-jsps-dust-moving-linkedin-dustjs-client-side-templates on Nov. 29 2012, LinkedIn Corp, pp. 1-3.
"What is server and client side code?" downloaded from http://www.daniweb.com/web-development/aspnet/threads/29366/what-is-server-and-client-side-code, on Nov. 29 2012, DaniWeb LLC, pp. 1-3.
Java Servlet downloaded from http://en.wikipedia.org/wiki/Java_Servlet on Nov. 29 2012, last updated Nov. 27, 2012, pp. 1-8.

* cited by examiner

Name 502
Company 504
Email 506
Contact Purpose General 508
Subject 510
Description 512
Submit 514

FIG. 5

Form: [ContactUS ▼] ─602

Client-Side Endpoint [www.mysmallbusinesswebsite.com] ─604

☑ Enable CAPTCHA ─606

Send responses to: ─608
☑ Email ─610
☐ SMS ─612
☐ Other ─614

*FIG. 6*

SERVICE FOR IMPLEMENTING FORM FIELDS

BACKGROUND

A typical website may be mostly static content in that the files that are served are not constructed or modified by server-side code at runtime. However, many of those typical websites also include a small amount content that requires the respective website's web developer to obtain a server to process requests made to that content, and to write and maintain server-side code to implement the functionality for that small amount of content. Writing and maintaining the server-side code adds a significant amount of work to an otherwise simple website.

BRIEF DESCRIPTION OF THE DRAWINGS

FIG. 5 is an example user interface for interacting with form fields implemented by the service, according to some embodiments.

FIG. 6 is an example developer interface for configuring the service, according to some embodiments

Figure 1:
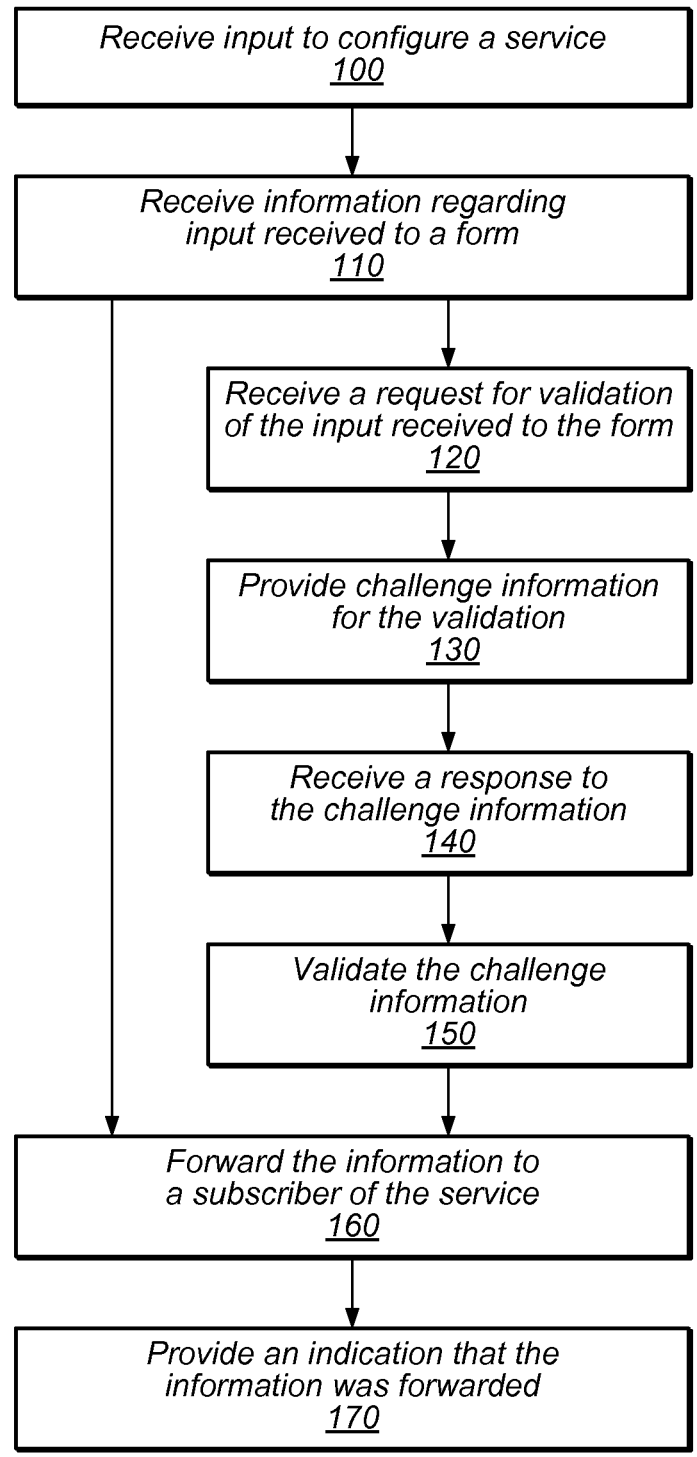
FIG. 1 is a flow diagram of a service for implementing form fields, according to some embodiments.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present invention as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"First," "Second," etc. As used herein, these terms are used as labels for nouns that they precede, and do not imply any type of ordering (e.g., spatial, temporal, logical, etc.). For example, for a system configured to provide a service for implementing form fields, the terms "first" and "second" fields of a form can be used to refer to any two fields. In other words, the "first" and "second" fields are not limited to logical fields 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of systems and methods for providing a service for implementing form fields are disclosed. Various ones of the present embodiments may include receiving, from a browser application, information regarding input received to a form rendered in the browser application. Various embodiments may also include forwarding the information to a subscriber of the service. In one embodiment, an indication that the information was forwarded to the subscriber may be provided (e.g., to the browser application. In some embodiments, the receiving the information, the forwarding the information, and the providing of the indication may be performed without executing server-side code on a server of the entity that provided content that includes the form.

The specification first describes a flowchart of one embodiment of a method for providing a service for implementing form fields, followed by a flowchart for one embodiment of a method for a browser interacting with the service. The specification then describes an example system that may implement the disclosed service, followed by example interfaces with the service. Various examples are provided throughout the specification.

Turning now to FIG. 1, one embodiment of a method for providing a service for implementing form fields is depicted. While the blocks are shown in a particular order for ease of understanding, other orders may be used. In some embodiments, the method of FIG. 1 may include additional (or fewer) blocks than shown. Blocks 100-170 may be performed automatically or may receive user input. In one embodiment, the method of FIG. 1 may be performed by the service for implementing form fields.

At 100, input may be received to configure a service. The service may be a web service that is configured to implement website functionality that would otherwise be implemented as server-side code and require a backend server with PHP, or some other server-side language, enabled. For example, the service may implement a form, which may include one or more fields that may accept input. Input to configure the service may include a selection of a form from a set of predefined available forms. Forms may include any template, widget, or other interactive web content that includes one or more input fields when displayed. Example forms may include a Contact Us form, an online poll, blogs, news feeds, simple shopping carts, an add/new comment field, adding a post or status to a social networking website, etc. An example Contact Us form is illustrated in FIG. 5, where input may be received to a Name 502, Company 504, Email 506, Contact Purpose 508, Subject 510, and Description field 512. Input may also be received to a submit button 514. Note that such Contact Us fields are illustrative and in other embodiments, a more sophisticated or simpler Contact Us form may be used. Moreover, note that the fields may be different for other forms. For example, an add a post form for a blog may simple include a comment field and a submit button.

Returning to block 100 of FIG. 1, the input to configure the service may include input to subscribe to the service, information regarding the subscriber, where to send responses, the location of the subscriber website implementing the form that uses the service, among others. Some of those examples are illustrated in FIG. 6, which may illustrate an example developer interface that is usable to configure the service. In the example shown, a form/widget is selected as ContactUS 602. The client-side endpoint 604 (e.g., the website implementing the form) is shown as www.mysmallbusinesswebsite.com. Security field 606 is selectable (e.g., via a checkbox) to enable a security measure, such as CAPTCHA, as described herein. Where to send the responses 608 is selectable (e.g., email 610, text message 612, other 614, etc.). In other embodiments, a different set of options may be presented in an interface usable to configure the service.

Turning back to FIG. 1, the entity subscribing to the service may be referred to as the subscriber. Accordingly, the subscriber may be associated with the form and vice versa. For example, the business/person/entity who owns www.mysmallbusinesswebsite.com may be referred to as the subscriber. Consider the following example. If a dentist's office uses the service to include a Contact Us form, the dentist's office (e.g., practice manager, dentist), as the subscriber to the service, may wish to receive contacts, made by visitors to the website to the form, via email. Such a preference may be selected during configuration of the service.

In various embodiments, the service may be configured without writing any source code (e.g., server-side code) for the form. The form may be implemented as client-side code (e.g., JavaScript, html, cascading style sheets (CSS), etc.) for the webpage with the client-side code including instructions to communicate with the service. In one embodiment, such instructions to communicate with the service may not actually render the form fields for display. Instead, in such an embodiment, the instructions to communicate with the service may be an application programming interface (API) or post request that is Ajax from the rest of the browser. In the example of FIG. 5, such an API may be linked with the submit button 514 such that upon selection of submit button 514 may cause the browser to send the information regarding the received input to the service. Rendering of the form fields for display may be implemented as JavaScript of the client-side code.

In one embodiment, the form may be implemented via cross-origin resource sharing through a browser. Note that static content (e.g., content that does not have backend functionality) that does not utilize the disclosed service may be implemented (e.g., stored) on a web service, such as S3, or elsewhere (e.g., on a local server). Regardless of the location from where the static content is served, modification of the static content may not affect the form content and vice versa in contrast to a system in which adding such a form would require the developer to move the static content offline to add the form.

In various embodiments, configuring and/or subscribing to the service, as described at block 100, may be performed before blocks 110-170. Note that the configuration and/or subscription to the service may be updated/modified after one or more of blocks 110-170 as well.

As shown at 110, information regarding input received to a form may be received by the service. In one embodiment, the information may be received from a browser application rendering the form on a client device. For example, as described in more detail at FIG. 2, the browser application may receive input to the form displayed by the browser application. The browser application may then provide that information regarding that input to the service at block 110. Consider, for example, the illustrative contact us form in FIG. 5. Input provided to the fields of the form, such as name, email, subject, and description may be the information received by the service at block 110. As described herein, one or more fields may be linked to the service such that upon selection of a linked field (e.g., submit button 514 of FIG. 5), the browser may provide the information regarding the received input to the service at block 110.

In some embodiments, the service may implement a security and/or validation measure, as described at block 120-150. In other embodiments, blocks 120-150 may not be used by the service. Instead, after the information is received at block 110, the method may proceed directly to block 160.

As illustrated at 120, a request for validation of the input that was received to the form may be received from the browser application. The request may include a request for a CAPTCHA from the service. In one embodiment, the request may be generated upon a user submitting the input received to the form field. For example, the request for validation of the input may be received upon selecting submit button 514 of FIG. 5. In other embodiments, the request for validation of the input may actually occur before the input is received to the form fields. For example, a selectable element may be presented on a webpage that permits a user visiting the webpage to request submission of a comment. In response to selection of that selectable element, a request for validation may be received and challenge information may be provided before the user actually provides input to the form fields of the form.

At block 130, challenge information for the validation may be provided to the browser application. Challenge information may include a CAPTCHA image and/or a unique request identifier. As described in more detail at FIG. 2, the browser may display the CAPTCHA image (e.g., as part of the form interface, such as in FIG. 5, or separate from the form in the browser) and store the unique identifier on the client computer executing the browser.

At 140, a response to the challenge information may be received, for example, from the browser application. The response to the challenge information may include a response to the CAPTCHA image and may also include the same unique request identifier. Note that the same unique request identifier may actually be a copy (e.g., stored at the client device) of the originally sent unique identifier. In embodiments in which the request for validation is received and challenge information is provided before the user actually provides input to the form fields, the response to the challenge information may be received as part of the same transmission in which the information is received at block 110. In such embodiments, the information regarding the input received to the form may be received along with the response to the challenge information.

As illustrated at 150, the input received to the form may be validated based, at least in part, on the received response to the challenge information. In one embodiment, the service may determine that the challenge information is valid and matches the challenge information that was provided to the browser. As a result of validating the challenge information, the input received to the form may also be validated.

In one embodiment, in response to validating the input, the contents of the information regarding the input received to the form may be stored by the service.

As shown at 160, the information may be forwarded to a subscriber of the service. Forwarding the information may be based, at least in part, on subscriber information that was received during configuration of the service. For example, the service configuration may include an email address and a preference to receive the information via email. Accordingly, the service may forward such information according to the subscriber preferences such as those shown in FIG. 6. As described herein, such preferences may include email, text message, or some other messaging platform.

At 170, an indication that the information was forwarded may be provided. For example, the service may provide the indication to the browser application that the information was forwarded to the subscriber. As described at FIG. 2, the browser application may then display a dialog box indicating that the information was received.

In embodiments in which the service implements the security measure of blocks 120-150, forwarding the information and providing the indication, as described at blocks 160 and 170, respectively, may be performed after the validation at block 150 has occurred.

In various embodiments, blocks 100-170 may be performed without executing server-side code on a server of the entity that provided content that includes the form. For instance, in an embodiment in which the security measure is not implemented, the receiving of block 110, the forwarding of block 160, and the providing the indication of block 170 may be performed without executing server-side code on a server of the entity that provided the content including the form. In embodiments in which the security measure is implemented, blocks 100-170 may each be performed without executing server-side code on a server of the entity that provided the content including the form.

By providing a centralized service for implementing forms, including commonly used forms like a Contact Us form, a webmaster may focus on the front end website without having to maintain a PHP (or other) server or write/maintain server-side code. Moreover, the centralized service may also be more secure against hacking (e.g., denial of service attacks). Such benefits may be helpful to small businesses, such as the dentist example above, where highly customized and expensive web design may not be a realistic option.

Figure 2:
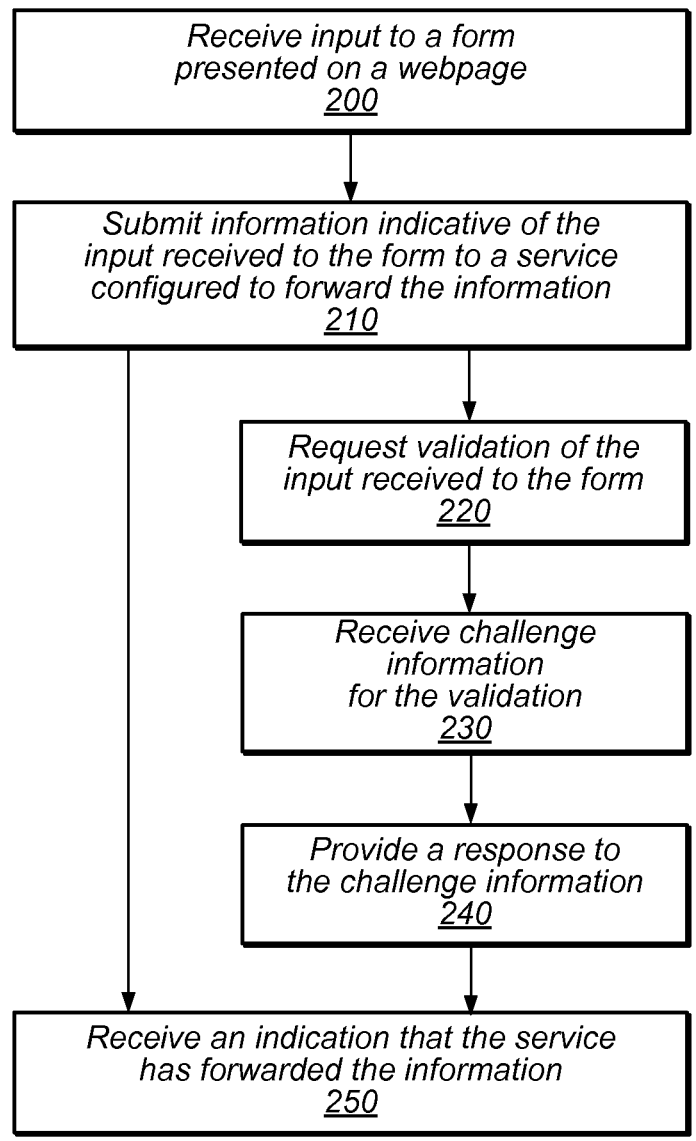
FIG. 2 is a flow diagram of a method for a browser interacting with a service implementing form fields, according to some embodiments.

Turning now to FIG. 2, one embodiment of a method for a browser interacting with a service implementing form fields is depicted. While the blocks are shown in a particular order for ease of understanding, other orders may be used. In some embodiments, the method of FIG. 2 may include additional (or fewer) blocks than shown. Blocks 200-250 may be performed automatically or may receive user input. In one embodiment, a browser application may implement the method of FIG. 2

Note that, in various embodiments, one or more blocks of the method of FIG. 1 may be used in combination with, or instead of various blocks of the method of FIG. 2. For brevity, some details are not repeated in FIG. 2 but note that the description of FIG. 1 may apply equally to the description of FIG. 2.

At 200, input may be received to a form presented on a webpage. For example, input may be received to fields of a form, such as the form illustrated in FIG. 5. In the illustrated form, input may be received to one or more form fields, such as name 502, company 504, email 506, contact purpose 508, subject 510, and description 512. Input may also be received to submit button 514. As described herein, the form may be implemented as client-side code for the webpage.

At 210, information indicative of the input received to the form may be submitted to a service configured to forward the information. Submission of the information may take place upon the form receiving input to the submit button 514, or comparable submission technique. In embodiments that do not use a security measure, such as CAPTCHA, submission of the information may result in the information being sent to and received by the service.

As described at FIG. 1, in some embodiments, a security measure (e.g., CAPTCHA) may be implemented as part of the service. In such embodiments, submission of the information at 210 may not necessarily directly result in the information being sent to or received by the service. As shown at 220, validation of the input received to the form may be requested. Validation may be requested upon loading the webpage, or upon receiving selection of the submit button 514. Thus, in one embodiment, submission of the information and request of validation may occur in response to the same trigger (e.g., selection of submit button 514).

As illustrated at 230, challenge information for the validation may be received. Challenge information may include a CAPTCHA image or sound and/or a unique request identifier. In one embodiment, client-side code, such as JavaScript, may display the CAPTCHA image. The unique request identifier may be stored on the client device implementing the browser.

At block 240, a response to the challenge information may be provided. For example, such a response may include characters corresponding to the CAPTCHA image and/or the unique request identifier. The unique request identifier provided as part of the response may be the copy of the request identifier stored at the client device.

As shown at 250, an indication that the service has forwarded the information may be received. In one embodiment, the indication may be received after the service validates the request and/or the information and/or forwards the information to the subscriber as described at FIG. 1. The service may then provide an indication that the information has been forwarded to the browser. The browser may then display such an indication to a user of the browser. For example, JavaScript in the client-side code may render a dialog box that informs the user that the message has been received.

In various embodiments, one or more blocks 200-250 of FIG. 2 may be performed without executing server-side code on a server of the entity that provided the content including the form for display on the browser. For instance, blocks 200, 210, and 250 may be performed without executing server-side code on a server of that entity.

Figure 3:
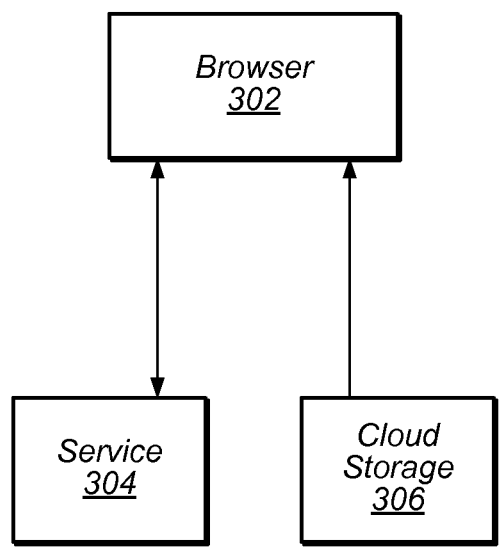
FIG. 3 is a block diagram of a system configured to implement a service for implementing form fields, according to some embodiments.

Turning now to FIG. 3, an example block diagram of a system configured to implement the service for implementing form fields is illustrated. Browser 302 may be configured to implement the method of FIG. 2 and service 304 may be configured to implement the method of FIG. 1. As illustrated and described herein, browser 302 may interface with service 304. Communication between browser 302 and service 304 may be implemented with JavaScript object notation (JSON) messages and/or extensible markup language (XML). Also shown in FIG. 3, browser 302 may interface with cloud storage 306 (or local storage). For example, content, such as static content, may be stored at cloud storage 306 and provided to browser 302 upon loading of a page of the content. Such content may be provided to browser 302 in the form of HTML, JavaScript, CSS, and images, among other examples.

Figure 4:
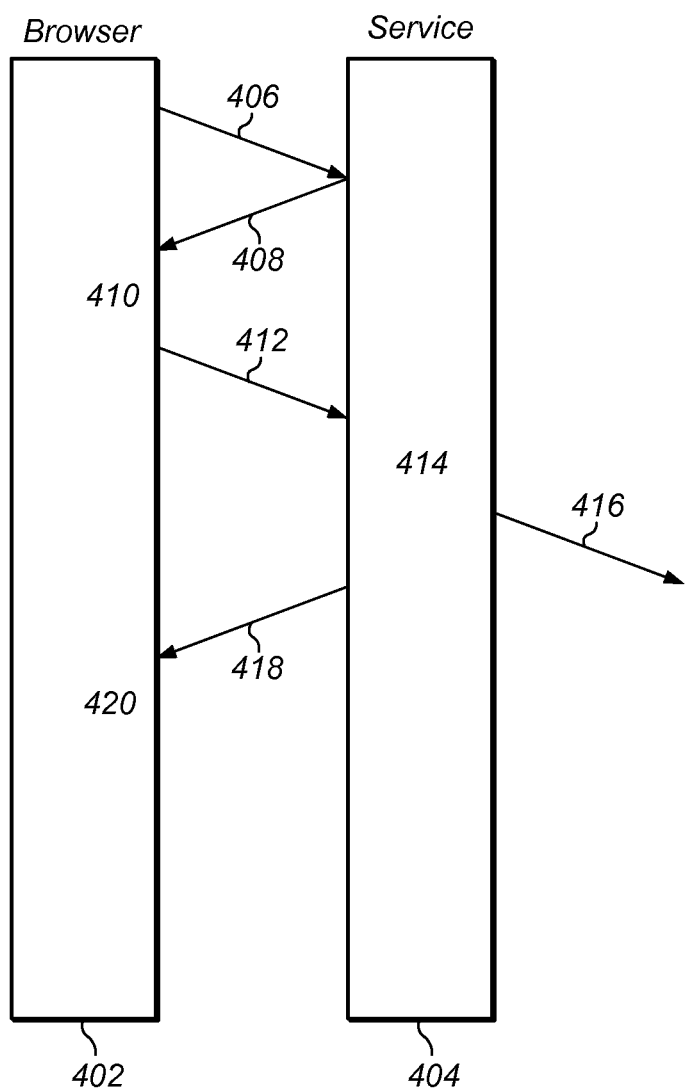
FIG. 4 is a block diagram of an example flow between a browser and the service, according to some embodiments.

An example flow between systems that may implement the methods of FIGS. 1 and 2, respectively, is shown in FIG. 4. As shown at 406, browser 402 may request a CAPTCHA from service 404. Service 404 may respond, at 408, with a CAPTCHA image and unique request identifier. At 410, JavaScript executed by browser 402 may cause the CAPTCHA image to be displayed and the unique identifier to be stored on the client device executing the browser. As shown at 412, browser 402 may provide information regarding input received to a form, such as a message subject and text, along with a CAPTCHA response and unique identifier to service 402. At 414, service 404 may confirm that the request is valid and store the contents of the request. At 416, service 402 may forward the information to the subscriber, based, at least in part, on the subscriber's preferences. Service may, at 418, provide an indication that the information has been forwarded to the subscriber. At 420, browser 402 may execute JavaScript to render a dialog box that informs a user of browser 402 that the information has been forwarded.

Figure 7:
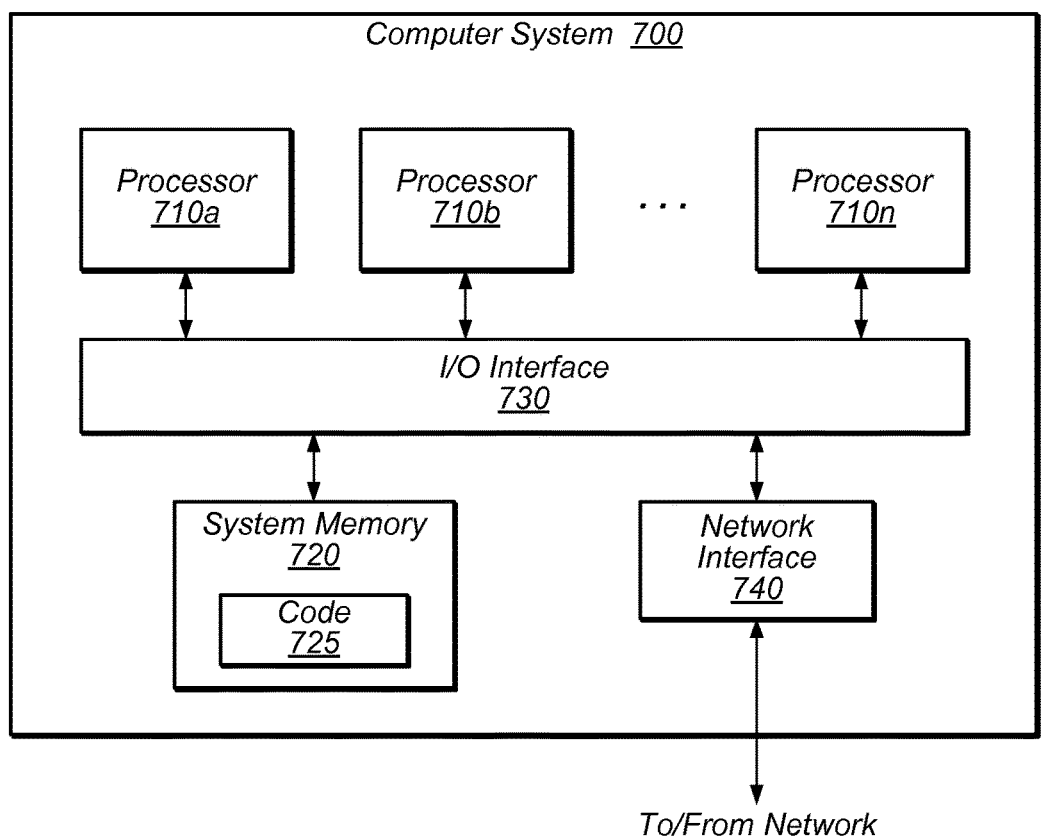
FIG. 7 is a block diagram illustrating a computer system configured to implement a service for implementing form fields, according to some embodiments.

An embodiment of a computer system including computer-accessible media is illustrated in FIG. 7. As illustrated, computer system 700 includes one or more processors 710 coupled to a system memory 720 via an input/output (I/O) interface 730. Computer system 700 further includes a network interface 740 coupled to I/O interface 730. In some embodiments, service 304 may be implemented using a single instance of computer system 700, while in other embodiments multiple such systems may be configured to host different portions or instances of the service. Moreover, in some embodiments, browser 302 and cloud storage 306 may be implemented via instances of computer system 700 that are distinct from those instances implementing other service 304.

In various embodiments computer system 700 may be a single processor system including one processor 710, or a multiprocessor system including several processors 710 (e.g., two, four, eight, or another suitable number). Processors 710 may be any suitable processor capable of executing instructions. For example, in various embodiments, processors 710 may be a general-purpose or embedded processor implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as code 725.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Embodiments may be provided as a computer program product including a non-transitory machine-readable storage medium having stored thereon instructions (in compressed or uncompressed form) that may be used to program a computer (or other electronic device) to perform processes or methods described herein. System memory 720 may be one embodiment of a computer-accessible/machine-readable storage medium configured to store program instructions and data as described above. However, in other embodiments, program instructions and/or data may be received, sent or stored upon different types of computer-accessible media. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
a memory; and
one or more processors coupled to the memory, wherein the memory comprises program instructions, that when executed by the one or more processors, cause the one or more processors to implement a service configured to:
receive, at the service, configuration input to configure the service, wherein the configuration input includes identification of a form and information regarding a subscriber specifying where to forward input received by the form, wherein the form is rendered by client-side code to be included in client content provided by an entity distinct from the service, and implemented as the client-side code to send the input received by the form to the service;
receive, at the service, from the client-side code executed by a browser application, the input received by the form, wherein the form is rendered in the browser application, and the form is included in the client content provided to the browser application by the entity distinct from the service;
forward, at the service, the input to the subscriber of the service based at least in part on the configuration input; and
provide, from the service to the browser application, an indication that the input was forwarded to the subscriber,
wherein said receiving of the input, said forwarding of the input, and said providing of the indication are performed at the service and without executing server-side code on at the entity that provided the client content including the form to the browser application.

2. The system of claim 1, wherein the service is further configured to:
receive, from the browser application, a request for validation of the input received to the form;
provide, to the browser application, challenge information for the validation;
receive, from the browser application, a response to the challenge information for the validation; and
validate the input received to the form based, at least in part, on the received response to the challenge information.

3. The system of claim 1, wherein the configuration input to configure the service includes information specifying a type of message to use to forward the input to the subscriber, wherein the type of message is one of an email message or a text message.

4. The system of claim 1, wherein the identification of the form in the configuration input to configure the service includes a selection of the form from a plurality of available forms for the service.

5. A method, comprising:
performing, by one or more computers that implement a service:
receiving, by the service, configuration input to configure the service, wherein the configuration input includes identification of a form and information regarding a subscriber specifying where to forward input received by the form, wherein the form is rendered by client-side code to be included in client content provided by an entity distinct from the service, and implemented as the client-side code to send the input received by the form to the service;
receiving, by the service, from the client-side code executed by a browser application, the input received by the form, wherein the form is rendered in the browser application, and the form is included in the client content provided to the browser application by the entity distinct from the service;
forwarding, by the service, the input to the subscriber of the service based at least in part on the configuration input; and
providing, from the service to the browser application, an indication that the input was forwarded to the subscriber,
wherein the receiving of the input, the forwarding of the input, and the providing of the indication are performed at the service and without executing server-side code at the entity that provided the client content including the form to the browser application.

6. The method of claim 5, wherein the identification of the form in the configuration input to configure the service includes a selection of the form from a plurality of available forms for the service.

7. The method of claim 5, wherein the configuration input to configure the service includes information specifying a type of message to use to forward the input to the subscriber, wherein the type of message is one of an email message or a text message.

8. The method of claim 5, wherein the configuration input to configure the service further includes input to subscribe to the service.

9. The method of claim 5, wherein the service is configured without writing source code for the form.

10. The method of claim 5, wherein the client-side code includes instructions to communicate with the service via an application programming interface (API) of the service.

11. The method of claim 5, further comprising:
receiving, from the browser application, a request for validation of the input received to the form;
providing, to the browser application, challenge information for the validation;
receiving, from the browser application, a response to the challenge information for the validation; and validating the input received to the form based, at least in part, on the received response to the challenge information.

12. The method of claim 5, wherein the service is implemented as a web service.

13. The method of claim 5, wherein the form is presented in the browser application with static content, and wherein the form is configured to be modified without affecting the static content.

14. The method of claim 11, wherein said forwarding the input to the subscriber of the service and said providing the indication that the input was forwarded to the subscriber are performed after said validating the input received to the form.

15. The method of claim 11, wherein the challenge information includes a unique identifier and wherein the response to the challenge information includes the same unique identifier.

16. The method of claim 15, wherein the unique identifier from the challenge information is stored at a client device implementing the browser application.

17. A non-transitory computer-readable storage medium storing program instructions, wherein the program instructions, when executed by one or more processors, are configured to cause the one or more processors to perform:
receiving, by a browser application, input to a form that is presented on a webpage provided by an entity, wherein the form is to be included in the webpage with static content, the form is configured to be modified without affecting the static content, and the form is rendered by and implemented as-client-side code configured to send the input received by the form to a service distinct from the entity;

submitting, by the client-side code executed by the browser application, the input received by the form to the service, wherein the service is configured to forward the input to a subscriber of the service, wherein the service is distinct from the entity that provided the form to the browser application, and the service is configured to associate the form with the subscriber; and receiving, by the browser application from the service, an indication that the service has forwarded the input to the subscriber.

18. The non-transitory computer-readable storage medium of claim 17, wherein the client-side code is configured to submit the input to the service via an application programming interface (API) of the service.

19. The non-transitory computer-readable storage medium of claim 17, wherein the program instructions, when executed by the one or more processors, are further configured to perform:
requesting validation of the input received to the form;
receiving challenge information for the validation; and
providing a response to the challenge information for the validation, wherein the service is configured to validate the input before forwarding the input.

20. The non-transitory computer-readable storage medium of claim 17, wherein said receiving of the input to the form, said submitting of the input, and said receiving of the indication are performed without executing server-side code at the entity that provided the webpage that includes the form.

* * * * *